United States Patent
Brass et al.

(10) Patent No.: US 7,305,255 B2
(45) Date of Patent: Dec. 4, 2007

(54) PERSONAL COMMUNICATIONS SERVER

(75) Inventors: Richard I. Brass, Friday Harbor, WA (US); David B. Wecker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 167 days.

(21) Appl. No.: 10/809,976

(22) Filed: Mar. 26, 2004

(65) Prior Publication Data

US 2005/0215286 A1   Sep. 29, 2005

(51) Int. Cl.
*H04B 1/38* (2006.01)
*H04M 1/00* (2006.01)
*B60R 25/04* (2006.01)
*B60R 25/10* (2006.01)

(52) U.S. Cl. ............ 455/557; 307/10.5; 307/10.6; 340/426.35; 340/426.36; 340/426.16; 455/556.1

(58) Field of Classification Search .......... 455/557, 455/559; 307/10.3–10.6
See application file for complete search history.

(56) References Cited

U.S. PATENT DOCUMENTS

| | | | | |
|---|---|---|---|---|
| 5,499,181 A | * | 3/1996 | Smith | 455/456.1 |
| 5,628,055 A | * | 5/1997 | Stein | 455/575.1 |
| 6,144,114 A | * | 11/2000 | Chutorash | 307/10.5 |
| 6,369,717 B1 | * | 4/2002 | Damiani et al. | 340/815.4 |
| 6,526,335 B1 | * | 2/2003 | Treyz et al. | 701/1 |
| 6,748,536 B1 | * | 6/2004 | Madau | 713/193 |
| 6,917,122 B2 | * | 7/2005 | May et al. | 307/9.1 |
| 6,967,562 B2 | * | 11/2005 | Menard et al. | 340/5.64 |
| 7,006,914 B1 | * | 2/2006 | Cahoon | 701/115 |
| 2003/0099212 A1 | * | 5/2003 | Anjum et al. | 370/328 |
| 2004/0093155 A1 | * | 5/2004 | Simonds et al. | 701/200 |
| 2004/0172531 A1 | * | 9/2004 | Little et al. | 713/155 |
| 2004/0178987 A1 | * | 9/2004 | Chen et al. | 345/156 |
| 2005/0262146 A1 | * | 11/2005 | Grace et al. | 707/104.1 |

* cited by examiner

*Primary Examiner*—Lester G. Kincaid
*Assistant Examiner*—Matthew C Sams
(74) *Attorney, Agent, or Firm*—Workman Nydegger

(57) ABSTRACT

An improved system and method for a personal communications server is provided. The system and method may provide seamless multi-functional wireless communications for different integrated applications desired by a user. To this end, a computing device with a telecommunications interface is provided for coupling to a mobile phone network. The computing device may be without an attached audio input and output device, but may include a network interface for coupling with an external audio input and output device to receive audio from the mobile phone network and/or to send audio to the mobile network. A computer with a network interface may also be coupled with the computing device to receive data from a mobile phone network and/or to send data to the mobile network.

38 Claims, 5 Drawing Sheets

PERSONAL COMMUNICATIONS SERVER

FIELD OF THE INVENTION

The invention relates generally to computer systems and communications, and more particularly to an improved system for communications using a personal communications server.

BACKGROUND OF THE INVENTION

The integration of wireless communications, vehicle monitoring systems and location devices has made significant progress over the past few years in the rapidly growing field of Telematics. However, wireless telephones have not yet evolved to the point where multi-functional communications operate seamlessly. Currently, wireless telephones include a transceiver, a keypad, a microphone, speaker and sometimes a display. In normal operation, such a wireless telephone is capable of handling the user's communications needs. However, if the wireless telephone user is driving a car, or attempting to interface with a personal digital assistant (PDA), Tablet, or other personal computing device, the user must modify the telephone to include a headset, or other interface device, to facilitate communication.

Moreover, such a modified wireless telephone poorly supports burgeoning telematics applications and fails to support the integration of wireless communications with other applications. For example, the wireless telephone may not be used as a secure access device for unlocking an automobile. If the automobile has communications facilities integrated with an electronic door locking system, drivers who are locked out of their vehicles instead must call a third-party service to gain access to their vehicles. As another example, a standalone wireless telephone may not be used by a personal computing device to provide a wireless network connection to a remote computing device. Rather, the personal computing device may be equipped with a wireless communications capability such as Wi-Fi, or the wireless telephone may be adapted to connect to the personal computing device using a network interface.

What is needed is a way for transparently providing personal communications capabilities that may flexibly operate in the telematics space as well as other application environments. Any such system should allow seamless multi-functional wireless communications for different integrated applications desired by a user.

SUMMARY OF THE INVENTION

Briefly, the present invention is an improved system for providing a personal communications server which may be used by other devices. To this end, a computing device with a telecommunications interface is provided for coupling to a mobile phone network. The computing device may be without an attached audio input and output device, but may include a network interface for coupling with an external audio input and output device to receive audio from the mobile phone network and/or to send audio to the mobile network. A computer with a network interface may also be coupled with the computing device to receive data from a mobile phone network and/or to send data to the mobile network.

The computing device may also include a display and/or one or more buttons as a user interface. The display may be in the form of any number of known types of displays such as one or more LEDs, a 2-line alphanumeric display, a monochrome display, or a color display. There may be a single button for switching between applications available on the computing device or selecting an operation or command available within a particular application. For instance, a button may be used to answer an incoming phone call in conjunction with a wireless headset or wireless conference station. Additionally, there may be one or more other application buttons dedicated for a particular application, such as locking and unlocking doors of an automobile.

In one embodiment, where the computing device may be operated with the computer system of an automobile, a key may be operably coupled to the computing device. Thereby, the antenna, audio, power and control may be routed through the key into the ignition switch of the car so that full hands-free operation of phone services may be transparently achieved. In another embodiment, the computing device may include an authentication interface to provide identification and/or authentication for any number of applications such as a secure access device for unlocking an automobile, network logon, financial transactions, digital signature, and so forth. The authentication interface may include USB connectivity and smart card functionality so that the computing device may operate as a readerless smart card.

Thus, the system of the present invention provide seamless multi-functional wireless communications for different integrated applications desired by a user. Other advantages will become apparent from the following detailed description when taken in conjunction with the drawings, in which:

DETAILED DESCRIPTION

The present invention is generally directed towards a system for providing a personal communications server. The personal communications server may be used by other devices such as wireless headsets, vehicle computer systems, mobile computing devices, and so forth. The personal communications server may provide seamless multi-functional wireless communications for different integrated applications desired by a user. As will be understood, the various block diagrams, flow charts and scenarios described herein are only examples, and there are many other scenarios to which the present invention will apply.

Figure 1:
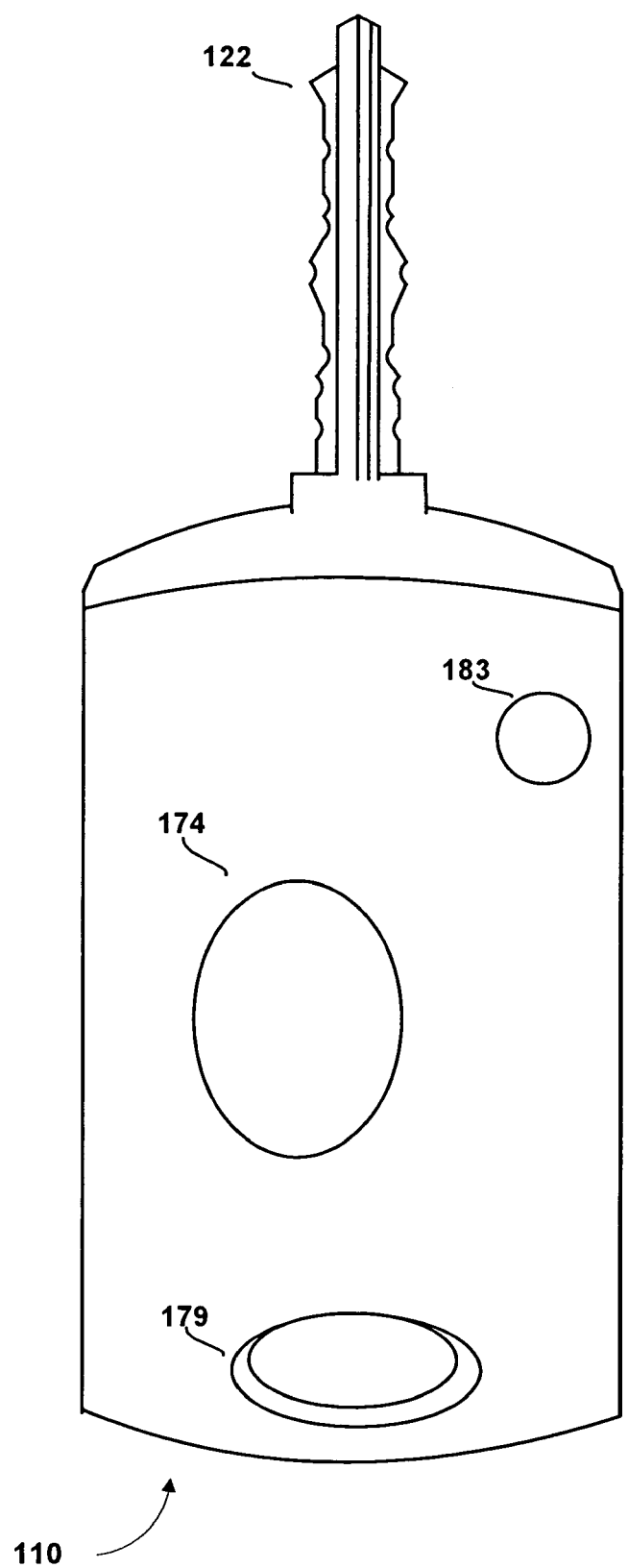
FIG. 1 is an exemplary illustration generally representing a personal communications server, in accordance with an aspect of the present invention.

FIG. 1 is an exemplary illustration generally representing a personal communications server incorporated into a computing device 110. In one alternative implementation, the computing device 110 may be in the form of a key fob that includes an attached key 122 and an opening 179 for attaching a key ring. The computing device 110 may include wireless communications functionality and personal area network connectivity. For example, the computing device may connect to a mobile phone network through a telecommunications interface capable of wireless communications using Global System for Mobile Communications (GSM), Code Division Multiple Access (CDMA), General Packet Radio Services (GPRS) or other wireless communications protocols. The computing device may also connect to Internet Service Providers using mobile communications protocols, such as GSM-IP, for accessing content and services over the Internet. The computing device may also be paired to a wireless headset or wireless conference station (microphone and speaker) using a personal area network protocol such as IEEE 802.11, Bluetooth™, Infrared Data Association (IrDA), or other wireless protocol. By combining the wireless communications functionality and personal area network connectivity in the computing device, incoming wireless phone calls may be received and answered using the computing device paired with a wireless headset or wireless conference station.

The computing device 110 illustrated in FIG. 1 may also have one or more buttons that allow a user to provide input for operating the computing device. For example, there may be a single button, such as button 174, for switching between applications available on the computing device or selecting an operation or command available within a particular application. For instance, the button 174 may be used to answer an incoming phone call in conjunction with a wireless headset or wireless conference station. Accompanying the button 174 may be an LED 183 that may provide a visual indication of the state of the computing device 110. If the device is turned on, the LED may illuminate as a steady green light. If there is an incoming call, the LED may blink red. If the device is turned off, the LED may be unlit. In one embodiment, notification of an incoming call may be indicated by an audible alert or vibration of the computing device 110.

The computing device 110 may have an attached key 122. In one embodiment, the personal communications server 110 may be coupled to the computer system of an automobile by insertion of the key 122 into the ignition switch of the automobile. Through the key, power may be supplied to the personal communications server 110, antenna signal may be received by the personal communications server 110, and audio may be transmitted between the personal communications server 110 and the computer system of the automobile.

Figure 2:
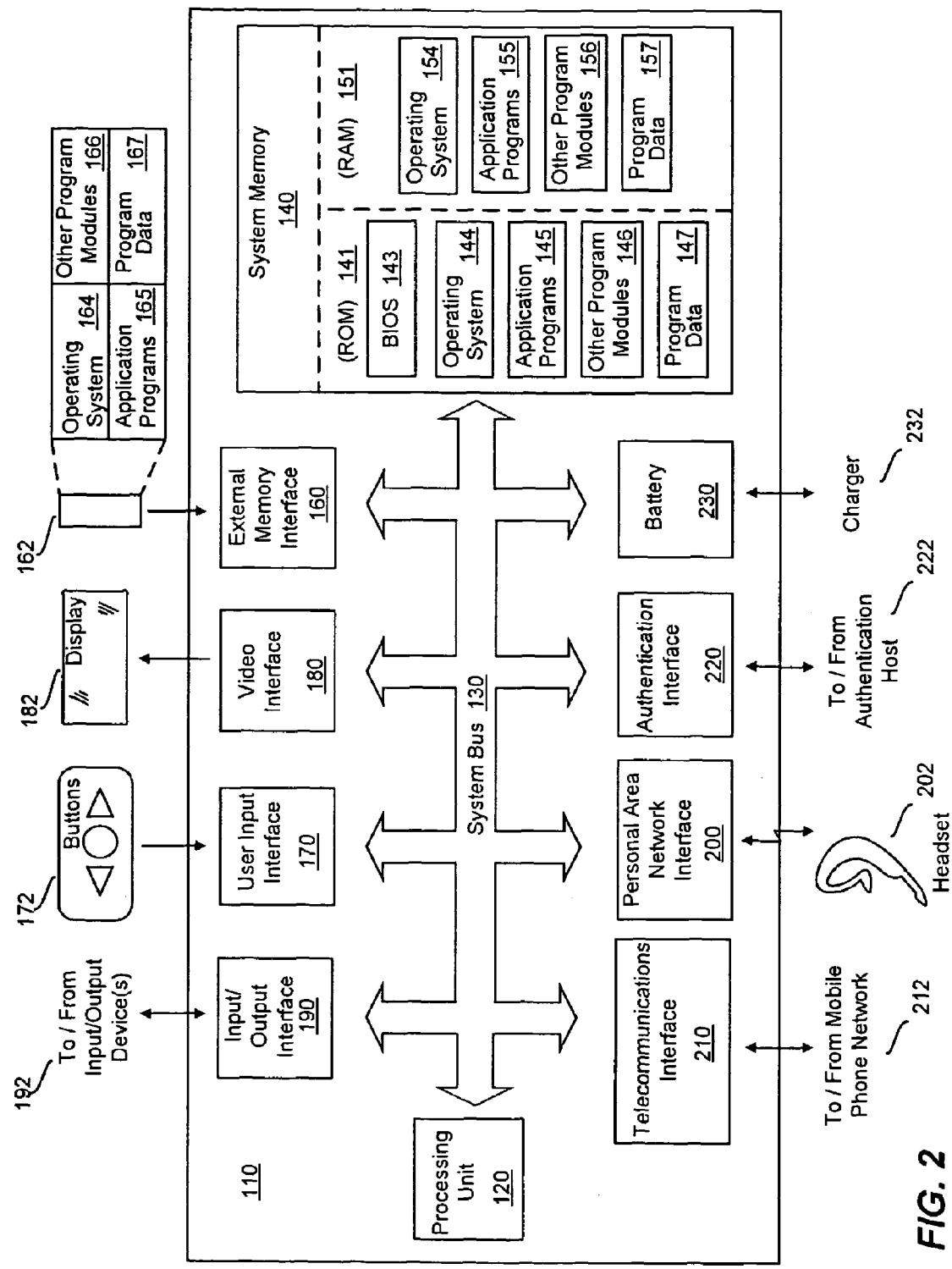
FIG. 2 is a block diagram generally representing the components in an exemplary embodiment of a personal communications server, in accordance with an aspect of the present invention.

FIG. 2 illustrates suitable components in an exemplary embodiment of a personal communications server. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a personal communications server.

The invention may be operational with numerous other general purpose or special purpose computing system environments or configurations. Examples of well known computing systems, environments, and/or configurations that may be suitable for use with the invention include, but are not limited to, pocket sized personal computers, personal digital assistants, and other mobile devices such as a Microsoft® Smartphone.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 2, an exemplary system for implementing the invention may include a general purpose computing device 110. Components of the computing device 110 may include, but are not limited to, a processing unit 120, a system memory 140, and a system bus 130 that couples various system components including the system memory to the processing unit 120. The system bus 130 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 110 may include a variety of computer-readable media. Computer-readable media can be any available media that can be accessed by the computing device 110 and includes both volatile and nonvolatile media. By way of example, and not limitation, computer-readable media may comprise computer storage media and communication media. Computer storage media includes volatile and nonvolatile media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computing device 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 140 includes computer storage media in the form of volatile and/or nonvolatile memory such as read only memory (ROM) 141 and random access memory (RAM) 151. A basic input/output system 143 (BIOS), containing the basic routines that help to transfer information between elements within computing device 110, such as during start-up, is typically stored in ROM 141. Additionally, ROM 141 may contain operating system 144, application programs 145, other program modules 146 and program data 147. RAM 151 typically contains data and/or program modules that are immediately accessible to and/or presently being operated on by processing unit 120. By way of example, and not limitation, FIG. 2 illustrates operating system 154, application programs 155, other program modules 156 and program data 157. Note that these components can either be the same as or different from operating system 144, application programs 145, other program modules 146, and program data 147. Operating system 154, application programs 155, other program modules 156, and program data 157 are given different numbers herein to illustrate that, at a minimum, they are different copies.

The computing device 110 may also include other volatile/nonvolatile computer storage media. By way of example only, FIG. 2 illustrates a flash memory device 162, such as a USB flash drive, which may read from or write to flash memory. The flash memory device 162 may be connected to the system bus 130 through external memory interface 160. Other removable/non-removable, volatile/nonvolatile computer storage media that can be used in the exemplary operating environment include, but are not limited to, magnetic media such as a magnetic disk or magnetic tape cassettes, optical media such as an optical disk, flash memory cards, digital versatile disks, digital video tape, solid state RAM, solid state ROM, and the like. Any devices or drives that may read from or write to such computer storage media may be connected to the system bus 130 through external memory interface 160. External memory interface 160 may be any removable, nonremovable, volatile or nonvolatile memory interface that may connect to a device or drive capable of reading from or writing to a computer storage medium. Such a device or drive may include, but is not limited to, a magnetic or optical disk drive, a flash drive, a memory card reader/writer, and the like.

The computer storage media, discussed above and illustrated in FIG. 2, provide storage of computer-readable instructions, data structures, program modules and other data for the computing device 110. In FIG. 2, for example, flash memory device 162 is illustrated as storing operating system 164, application programs 165, other program modules 166 and program data 167. Note that these components can either be the same as or different from operating system 144, application programs 145, other program modules 146, and program data 147. Operating system 164, application programs 165, other program modules 166, and program data 167 are given different numbers herein to illustrate that, at a minimum, they are different copies.

A user may enter commands and information into the computing device 110 through input devices such as buttons 172. Other input devices not shown in FIG. 2 may include a tablet, or electronic digitizer, a microphone, a keyboard, a pointing device (commonly referred to as mouse), trackball, touch pad, joystick, game pad, satellite dish, scanner, or other devices. These and other input devices are often connected to the processing unit 120 through a user input interface 170 that is coupled to the system bus, but may be connected by other interface and bus structures, such as a parallel port, game port or a universal serial bus (USB). A display device may also be connected to the system bus 130 via an interface, such as a video interface 180. The display 182 may be in the form of any number of known types of displays such as one or more LEDs, a 2-line alphanumeric display, a monochrome display, or a color display. Furthermore, a display, as referred herein, may be any visual, audible, or tactile representations. In one embodiment, the display 182 may also be optionally integrated with a touch-screen panel or the like. Note that the display, and/or a touch screen panel in another embodiment, can be physically coupled to a housing in which the computing device 110 is incorporated, such as in a tablet-type personal computer. In addition, the computing device 110 may also include other peripheral output devices not shown such as a headset or speakers, which may be connected through an input/output interface 190 available for input/output devices 192.

The computing device 110 may operate in a networked environment using local connectivity to one or more computing or communications devices. The local connectivity depicted in FIG. 2 includes a personal area network (PAN) such as wireless headset 210 connected to the system bus 130 through personal area network interface 200. The personal areas network devices may include any computing or communication device such as a PDA, telephone, fax, modem, printer, smartcard or the like. In addition to wireless connectivity using IEEE 802.11, Bluetooth™, Infrared Data Association (IrDA), or other wireless interface, the local connectivity may also be wired using a USB interface, firewire interface or other bus interface. The local connectivity may also include other networks not shown, such as a local area network (LAN) or a wide area network (WAN). When used in a LAN networking environment, the computing device 110 may be connected through PAN interface 200 or, in another embodiment, to the LAN through a wired or wireless network interface or adapter. When used in a WAN networking environment, the computing device 110 may use the telecommunications interface 210 or may include a modem connected to the system bus 130 via the user input interface 170 or other means for establishing communications over the WAN. In a networked environment, program modules depicted relative to the computing device 110, or portions thereof, may be stored in the remote memory storage device. It will be appreciated that the network connections shown are exemplary and other means of establishing a communications link between the computing devices may be used.

The computing device 110 may operate in a communications environment using wireless connectivity to one or more communications networks. The wireless connectivity depicted in FIG. 2 includes a mobile phone network 212 connected to the system bus 130 through telecommunications interface 210. The mobile phone network may be any wireless communications network such as Global System for Mobile Communications (GSM), Code Division Multiple Access (CDMA), General Packet Radio Services (GPRS) or the like. The mobile communications network may also connect directly to Internet Service Providers using mobile communications protocols, such as GSM-IP, for accessing content and services over the Internet. In addition to wireless connectivity, land line telecommunications networks like plain old telephone service (POTS) may be connected to the system bus 130 of the computing device 110 by wire through the telecommunications interface 210.

The computing device 110 may further operate as a smart card to provide identification and/or authentication for any number of applications such as network logon, financial transactions, digital signature, and so forth. For this purpose, the computing device 110 may include an authentication interface 220 that may connect an authentication host 222 to the system bus 130. In one embodiment, the authentication interface 220 may implement both USB and smart card functionality so that the computing device 110 may operate as a readerless smart card. The smart card functionality may include a range of commands specified by smart card standards such as ISO 7816-3 and/or CEN 726. The USB functionality may include USB-related configuration and communication channels compliant with the USB Chip/Smart Card Interface Devices (CCID) Specification (revision 1.0 or later), so that the computing device 110 may plug directly into the USB port on an authentication host, such as a computer. In another embodiment, the authentication interface may use a protocol for communicating with an authentication interface device such as a smart card reader.

The computing device 110 may include a battery 230 connected to the system bus 130 to provide power to the computing device. In one embodiment, power may also be supplied by connecting a charger 232 to the computing device 110, and the battery 230 may be recharged while the computing device 110 is connected to the charger 232. Additionally, a battery charge level indicator may be displayed on the display in one embodiment to indicate the current charge level of the battery.

Figure 3:
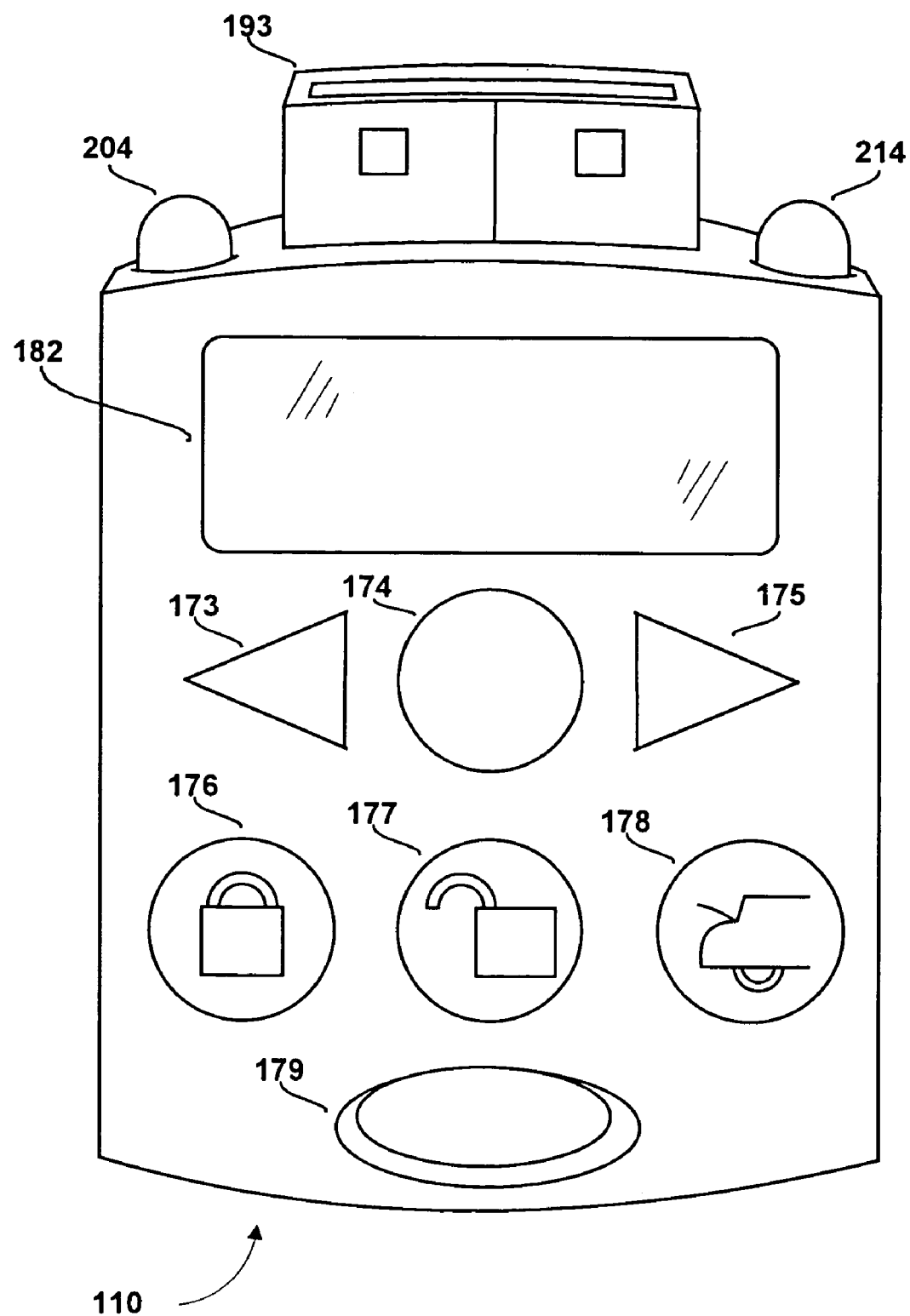
FIG. 3 is another exemplary illustration generally representing a personal communications server, in accordance with an aspect of the present invention.

FIG. 3 presents another exemplary illustration generally representing a personal communications server incorporated into a computing device 110. In another alternative implementation, the computing device 110 may be in the form of a key fob that includes an opening 179 for attaching a key ring. The computing device 110 may include wireless communications functionality and personal area network connectivity. The computing device may connect to a mobile phone network through a telecommunications interface capable of wireless communications using GSM, CDMA, GPRS or other wireless communications protocols. The computing device may also connect to Internet Service Providers using mobile communications protocols, such as GSM-IP, for accessing content and services over the Internet. The computing device may have an integral extendible antenna, such as antenna 204, for receiving radio signals from the mobile phone network. The computing device may also be paired to a wireless headset or wireless conference station (microphone and speaker) using a personal area network protocol such as IEEE 802.11, Bluetooth™, Infrared Data Association (IrDA), or other wireless protocol. The computing device may also have an integral extendible antenna or the like, such as antenna 214, for receiving radio signals from the personal area network. By combining the wireless communications functionality and personal area network connectivity in the computing device, incoming wireless phone calls may be received and answered using the computing device paired with a wireless headset or wireless conference station.

The computing device 110 illustrated in FIG. 3 may have a pluggable connector such as USB connector 193 which may allow the personal communications server to be plugged into another computing device, including the computer system of an automobile, a charging or docking station, a security or financial transaction system, and so forth. Additionally, the computing device 110 may have a display 182 in the form of any number of known types of displays such as one or more LEDs, a 2-line alphanumeric display, a monochrome display, or a color display. The computing device 110 may also have one or more buttons that allow a user to provide input for operating the computing device. For example, there may be a single button, such as button 174, for switching between applications available on the computing device or selecting an operation or command available within a particular application. For instance, button 174 may be used to answer an incoming phone call in conjunction with a wireless headset or wireless conference station. Accompanying the single button may also be a forward button, such as button 173, and a backward button, such as button 175, to allow a user to scroll forward and backward through a list of options or commands available among various applications or within a particular application. Additionally, there may be one or more other application buttons dedicated for a particular application, such as locking and unlocking doors of an automobile. For example, button 176 may be an application button dedicated to locking the doors of an automobile. Similarly, button 177 may be dedicated to unlocking the doors of an automobile. And button 178 may be dedicated to unlocking the trunk of an automobile.

Those skilled in the art will appreciate that any other input device may be used, using wired or wireless connectivity, such as a keyboard, microphone, joystick, game pad or other device including a device that contains a biometric sensor, environmental sensor, position sensor, or other type of sensor.

Figure 4:
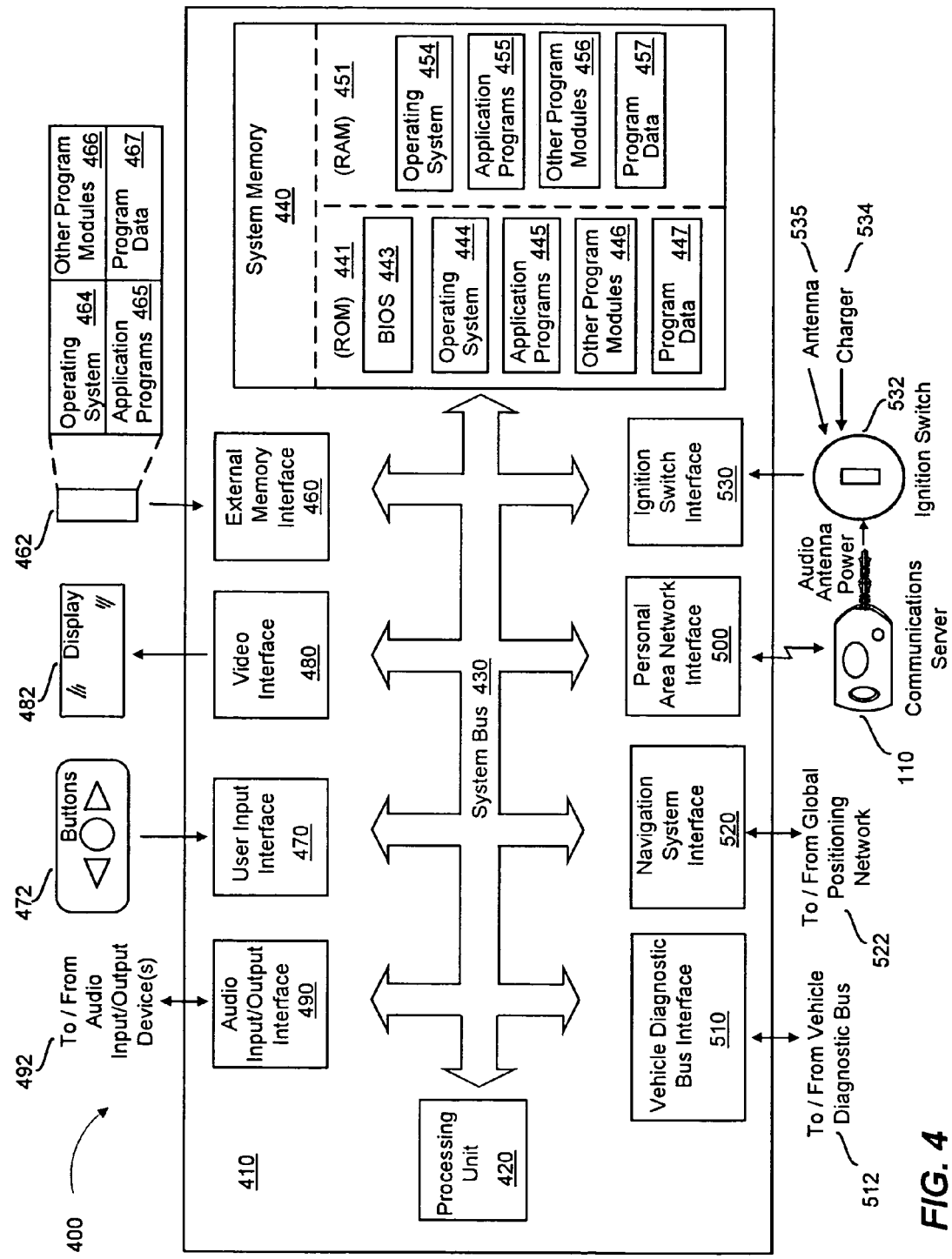
FIG. 4 is a block diagram generally representing a computer system of an automobile, with which the present invention may be coupled, in accordance with an aspect of the present invention.

FIG. 4 illustrates an example of a suitable computing system environment of an automobile 400, with which the present invention may be coupled. The computing system environment 400 is only one example of a suitable computing environment of an automobile and is not intended to suggest any limitation as to the scope of use or functionality of the invention. Neither should the computing environment 400 be interpreted as having any dependency or requirement relating to any one or combination of components illustrated in the exemplary operating environment 400.

The exemplary computing system of an automobile in FIG. 4 may include a general purpose computer 410. Components of the computer 410 may include, but are not limited to, a processing unit 420, a system memory 440, and a system bus 430 that couples various system components including the system memory to the processing unit 420. The system bus 430 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 may include a variety of computer-readable media. Computer-readable media can be any available media that can be accessed by the computer 410 and includes both volatile and nonvolatile media. By way of example, and not limitation, computer-readable media may comprise computer storage media and communication media. The system memory 440 includes computer storage media in the form of volatile and/or nonvolatile memory such as read only memory (ROM) 441 and random access memory (RAM) 451. A basic input/output system 443 (BIOS), containing the basic routines that help to transfer information between elements within computer 410, such as during start-up, is typically stored in ROM 441. Additionally, ROM 441 may contain operating system 444, application programs 445, other program modules 446 and program data 447. RAM 451 typically contains data and/or program modules that are immediately accessible to and/or presently being operated on by processing unit 420. By way of example, and not limitation, FIG. 4 illustrates operating system 454, application programs 455, other program modules 456 and program data 457. Note that these components can either be the same as or different from operating system 444, application programs 445, other program modules 446, and program data 447. Operating system 454, application programs 455, other program modules 456, and program data 457 are given different numbers herein to illustrate that, at a minimum, they are different copies.

The computer 410 may also include other volatile/nonvolatile computer storage media. By way of example only, FIG. 4 illustrates a flash memory device 462, such as a USB flash drive, which may read from or write to flash memory. The flash memory device 462 may be connected to the system bus 430 through external memory interface 460. Other removable/non-removable, volatile/nonvolatile computer storage media that can be used in the exemplary operating environment include, but are not limited to, magnetic media such as a magnetic disk or magnetic tape cassettes, optical media such as an optical disk, flash memory cards, digital versatile disks, digital video tape, solid state RAM, solid state ROM, and the like. Any devices or drives that may read from or write to such computer storage media may be connected to the system bus 430 through external memory interface 460. External memory interface 460 may be any removable, nonremovable, volatile or nonvolatile memory interface that may connect to a device or drive capable of reading from or writing to a computer storage medium. Such a device or drive may include, but is not limited to, a magnetic or optical disk drive, a flash drive, a memory card reader/writer, and the like.

The computer storage media, discussed above and illustrated in FIG. 4, provide storage of computer-readable instructions, data structures, program modules and other data for the computer 410. In FIG. 4, for example, flash memory device 462 is illustrated as storing operating system 464, application programs 465, other program modules 466 and program data 467. Note that these components can either be the same as or different from operating system 444, application programs 445, other program modules 446, and program data 447. Operating system 464, application programs 465, other program modules 466, and program data 467 are given different numbers herein to illustrate that, at a minimum, they are different copies.

A user may enter commands and information into the computer 410 through input devices such as buttons 472. Other input devices not shown in FIG. 4 may include a tablet, or electronic digitizer, a microphone, a keyboard, a pointing device (commonly referred to as mouse), trackball, touch pad, joystick, game pad, satellite dish, scanner, or other devices. These and other input devices are often connected to the processing unit 420 through a user input interface 470 that is. coupled to the system bus, but may be connected by other interface and bus structures, such as a parallel port, game port or a universal serial bus (USB). A display device may also be connected to the system bus 430 via an interface, such as a video interface 480. The display 482 may be in the form of any number of known types of displays such as one or more LEDs, a 2-line alphanumeric display, a monochrome display, or a color display. In one embodiment, the display 482 may also be optionally integrated with a touch-screen panel or the like. Note that the display, and/or a touch screen panel in another embodiment, can be physically coupled to a housing in which the computer 410 is incorporated, such as in a tablet-type personal computer. In addition, the computer 410 may also include other peripheral output devices not shown such as a headset or speakers, which may be connected through an audio input/output interface 490 for audio input/output devices 192.

The computer 410 may operate in a networked environment using local connectivity to one or more computing or communications devices. The local connectivity depicted in FIG. 4 includes a personal area network (PAN) such as personal communications server 110 connected to the system bus 430 through personal area network interface 500. In addition to wireless connectivity using IEEE 802.11, Bluetooth™, Infrared Data Association (IrDA), or other wireless interface, the local connectivity may also be wired using a USB interface, firewire interface or other bus interface. The local connectivity may also include other networks not shown, such as a local area network (LAN) or a wide area network (WAN). When used in a LAN or WAN networking environment, the computer 410 may be connected through PAN interface 500 or, in another embodiment, to the LAN or WAN through a wired or wireless network interface or adapter. In a networked environment, program modules depicted relative to the computer 410, or portions thereof, may be stored in the remote memory storage device. It will be appreciated that the network connections shown are exemplary and other means of establishing a communications link between the computers may be used.

A vehicle diagnostic bus 512 may also be coupled to the system bus 430 of the computer 410 through vehicle diagnostic bus interface 510. As a safety precaution for preventing corruption of critical vehicle systems, the vehicle diagnostic bus interface may allow read only operations or, in one embodiment, restricted write operations. The computer 410 may additionally include a navigation system interface 520 that provides connectivity between the system bus 430 and a global system positioning system 522.

The present invention may operate as a communications server to provide voice and/or data for any number of applications and services such as phone services, road-side assistance services, navigation applications, vehicle diagnostic applications, and so forth. In one embodiment, the personal communications server 110 may be coupled to the computer 410 by insertion of a key connected to the personal communications server into the ignition switch 532 of the automobile. The ignition switch 532 may be connected to the system bus 430 of the computer 410 through an ignition switch interface 530. A power charger 534 may be connected to the ignition switch 532 and an antenna 535 may be connected to the ignition switch 532. Through the key, power may be supplied to the personal communications server 110, antenna signal may be received by the personal communications server 110, and audio may be transmitted between the personal communications server 110 and the computer 410. In one embodiment, the ignition switch interface may be a USB interface.

Figure 5:
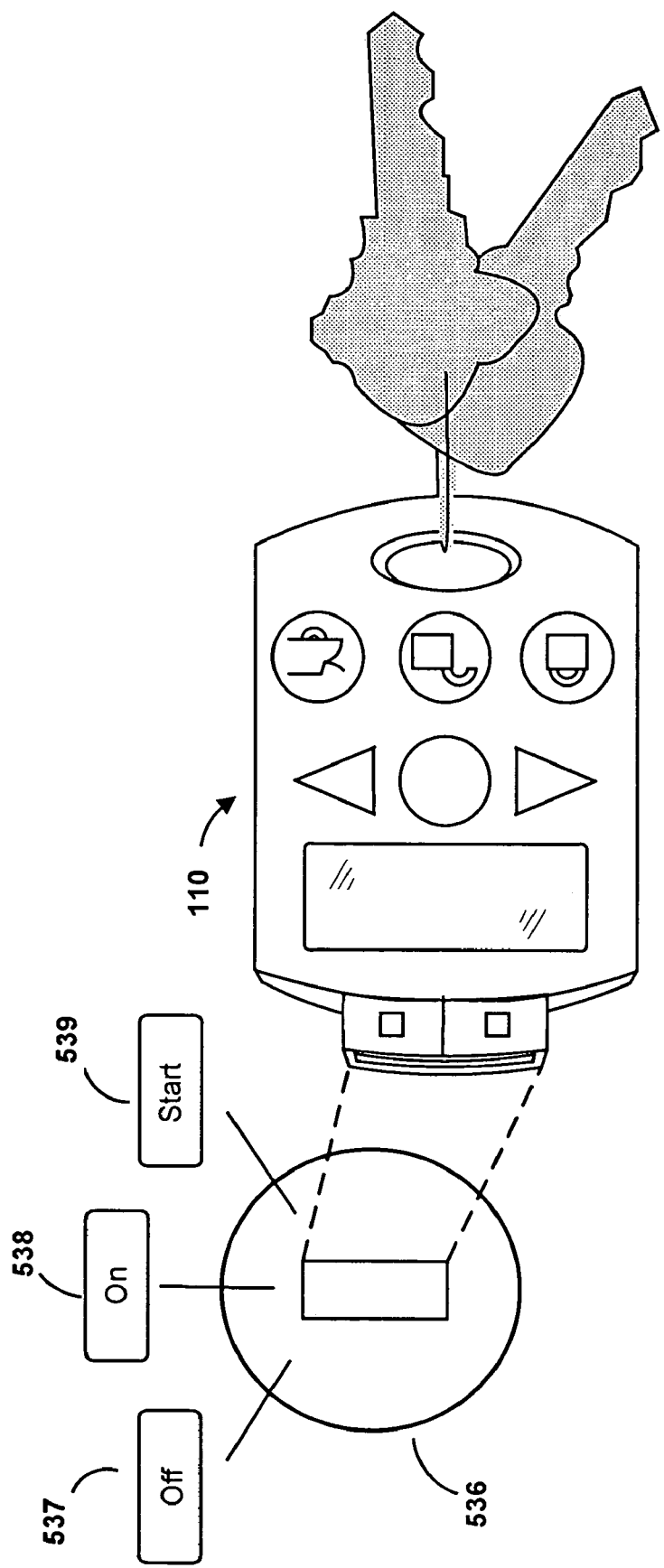
FIG. 5 is an exemplary illustration generally representing a secure access lock for starting an automobile and activating the computer system of an automobile using a personal communications server, in accordance with an aspect of the present invention.

FIG. 5 presents an exemplary illustration generally representing a secure access lock for starting an automobile and activating the computer system of an automobile using a personal communications server. The lock 536 may have a USB connector or other type of connector for coupling with the personal communication server. The lock 536 may be able to rotate to several positions. For example, there are three positions shown in FIG. 5. The personal communications server 110 may be inserted in the USB connector of the lock 536 which may be initially in the Off 537 position. A user may then rotate the personal communications server 110 to the On 538 or Start 539 position. In one embodiment, the On 538 position may activate the computer system of the automobile and may activate other systems such as the radio. In another embodiment, rotating the personal communications server 110 to the Start 539 position may start the automobile. Advantageously, the lock 536 may be operably coupled to the ignition switch 532 of the automobile through an ignition switch interface 530 shown in FIG. 2. Those skilled in the art will appreciate that the personal communications server 110 may also be used with a secure access lock for other applications such as locking and unlocking a house, office, hotel room, bicycle lock, and so forth.

As can be seen from the foregoing detailed description, the present invention provides an improved system for a personal communications server used by other devices. Advantageously, the personal communications server may be coupled with a wireless headset, a vehicle computer system, any mobile computing device, and so forth. Once so coupled to the personal communications server, any of these devices may send and receive phone services from a mobile phone network. As is now understood, the system described for a personal communications server is one example of many system configurations that may use the present invention for providing mobile phone communications as a server to other devices. Other system configurations for providing a personal communications server may include a dongle that would allow the communications server to be plugged into other devices, or may use the display of another device to display text messages from a mobile network, or may include an authentication interface to allow access to devices and buildings, and so forth. The system may also provide seamless multi-functional wireless communications for an unlimited number of different integrated applications desired by a user. For example, the personal communications server may include emergency functions such as an automated call for help, or may provide a periodic update of current location to designated recipients via phone or text message, or may provide information for mobile navigation applications, and so forth. As a result, the system and method provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system for handling phone services, comprising:
 a computing device comprising:
   at least one standalone operating state;
   a telecommunications interface for coupling to a mobile phone network, the telecommunications interface operable to receive data from the mobile phone network;
   an ignition switch interface configured to selectively connect to the ignition switch of an automobile for connecting the computing device to the bus of a computer when the ignition switch interface is inserted into the ignition switch;
   wherein the ignition switch interface configured to connect to the ignition switch of an automobile facilitates an antenna signal transmitted from said mobile phone network to be received by the computing device through the ignition switch interface; and
 a computer without a telecommunications interface for coupling to a mobile phone network, the computer comprising:
   a network interface coupled to the computing device to receive data from the mobile phone network via the telecommunications interface at the computing device; and
   an interface selectively coupled to an ignition switch, wherein the ignition switch is configured to connect to the ignition switch interface of the computing device to connect the ignition switch interface to a bus of the computer through the ignition switch.

2. The system of claim 1 further comprising an audio input and output device external to the computing device, the audio input and output device having a network interface for coupling with the computing device to receive audio from the mobile phone network.

3. The system of claim 1 wherein the network interface coupled to the computing device comprises a network interface to send data to the mobile phone network.

4. The system of claim 2 wherein the network interface coupled to the computing device comprises a network interface for coupling with the computing device to send audio to the mobile phone network.

5. The system of claim 1 wherein the telecommunications interface for coupling to a mobile phone network comprises a telecommunications interface for coupling to at least one of a Global System for Mobile Communications network, a Code Division Multiple Access network, a General Packet Radio Services network, or a Global System for Mobile Communications Internet Protocol network.

6. The system of claim 1 wherein the network interface comprises a personal area network interface.

7. The system of claim 1 wherein network device comprises a local area network interface.

8. The system of claim 1 wherein the network interface comprises a wide area network interface.

9. The system of claim 2 wherein the audio input and output device external to the computing device comprises a headset.

10. The system of claim 2 wherein the audio input and output device external to the computing device comprises a conference station.

11. The system of claim 1 further comprising a display coupled to the computing device.

12. The system of claim 11 wherein the display comprises a notification indicator.

13. The system of claim 12 wherein the notification indicator comprise a light.

14. The system of claim 11 wherein the display uses at least one member of the set comprising visual, audible, and tactile representations.

15. The system of claim 1 further comprising a button coupled to the computing device for providing input to operating the computing device.

16. The system of claim 15 wherein the button comprises an application button dedicated for operating a particular application.

17. The system of claim 1 further comprising an authentication interface operably coupling an authentication host to the computing device.

18. The system of claim 17 wherein the authentication interface comprises USB connectivity and smart card functionality for the computing device to operate as a readerless smart card.

19. The system of claim 1 wherein the ignition switch interface configured to connect to the ignition switch of an automobile comprises an automobile key.

20. The system of claim 1 wherein the ignition switch interface configured to connect to the ignition switch of an automobile comprises a USB interface.

21. The system of claim 1 wherein the ignition switch interface configured to connect to the ignition switch of an automobile facilitates at least one of power being supplied to the computing device through the ignition switch interface and audio being transmitted between the computing device and the computer through the ignition switch interface.

22. A system for handling phone services, comprising:
a computing device without an attached audio input and output device, the computing device comprising:
at least one standalone operating state;
a telecommunications interface for coupling to a mobile phone network, the telecommunications interface operable to receive data from the mobile phone network;
a network interface configured to couple to devices external to the computing device to provide data from the mobile phone network to devices external to the computing device; and
an ignition switch interface configured to selectively connect the computing device to the bus of an external computer through the ignition switch of an automobile when the ignition switch interface is inserted into the ignition switch; and
wherein the ignition switch interface configured to connect to the ignition switch of an automobile facilitates an antenna signal transmitted from said mobile phone network to be received by the computing device through the ignition switch interface.

23. The system of claim 22 wherein the network interface comprises a network interface configured to send audio to the mobile phone network.

24. The system of claim 22 wherein the telecommunications interface for coupling to a mobile phone network comprises a telecommunications interface for coupling to a Global System for Mobile Communications network, a Code Division Multiple Access network, a General Packet Radio Services network, or a Global System for Mobile Communications Internet Protocol network.

25. The system of claim 22 wherein the network interface comprises a personal area network interface.

26. The system of claim 22 wherein network interface comprises a local area network interface.

27. The system of claim 22 wherein the network interface comprises a wide area network interface.

28. The system of claim 22 further comprising an audio input and output device external to the computing device coupled through the network interface to the computing device, wherein the audio input and output device comprises a headset.

29. The system of claim 22 further comprising an audio input and output device external to the computing device coupled through the network interface to the computing device, wherein the audio input and output device comprises a conference station.

30. The system of claim 22 further comprising a display coupled to the computing device.

31. The system of claim 30 wherein the display comprises a notification indicator.

32. The system of claim 31 wherein the notification indicator comprise a light.

33. The system of claim 30 wherein the display uses at least one member of the set comprising visual, audible, and tactile representations.

34. The system of claim 22 further comprising a button coupled to the computing device for providing input to operating the computing device.

35. The system of claim 22 wherein the button comprises an application button dedicated for operating a particular application.

36. The system of claim 22 wherein the ignition switch interface configured to connect to the ignition switch of an automobile comprises an automobile key.

37. The system of claim 22 wherein the ignition switch interface configured to connect to the ignition switch of an automobile comprises a USB interface.

38. The system of claim 22 wherein the ignition switch interface configured to connect to the ignition switch of an automobile facilitates at least one of power being supplied to the computing device through the ignition switch interface and audio being transmitted between the computing device and the computer through the ignition switch interface.

* * * * *